United States Patent [19]

Geyer

[11] Patent Number: 4,561,086
[45] Date of Patent: Dec. 24, 1985

[54] OPTICAL WRITE/READ UNIT WITH SELECTIVE-TRANSPARENCY COVER

[75] Inventor: Frederick F. Geyer, Rochester, N.Y.

[73] Assignee: Eastman Kodak Company, Rochester, N.Y.

[21] Appl. No.: 493,845

[22] Filed: May 12, 1983

[51] Int. Cl.$^4$ .............................................. G11B 7/00
[52] U.S. Cl. ........................... 369/100; 369/284; 369/291
[58] Field of Search ............... 369/93, 94, 100, 101, 369/108, 109, 111, 275, 284, 287, 291, 118; 346/76 L, 135.1; 430/945, 961

[56] References Cited

U.S. PATENT DOCUMENTS

| | | | |
|---|---|---|---|
| 3,689,768 | 9/1972 | Sato et al. | 346/135.1 |
| 3,906,510 | 9/1975 | Hattori et al. | 346/108 |
| 4,038,663 | 7/1977 | Day et al. | 369/286 |
| 4,039,764 | 8/1977 | Bricot et al. | 369/275 |
| 4,074,282 | 2/1978 | Balas, Jr. et al. | 369/275 |
| 4,090,031 | 5/1978 | Russell | 369/94 |
| 4,340,959 | 7/1982 | Levin | 369/275 |
| 4,360,908 | 11/1982 | Howe et al. | 369/109 |
| 4,365,258 | 12/1982 | Geyer et al. | 346/135.1 |
| 4,394,661 | 7/1983 | Peeters | 346/135.1 |
| 4,404,656 | 9/1983 | Cornet | 369/100 |
| 4,412,231 | 10/1983 | Namba et al. | 346/135.1 |

*Primary Examiner*—Donald McElheny, Jr.
*Attorney, Agent, or Firm*—Warren W. Kurz

[57] ABSTRACT

An optical write/read unit includes a support, an overlying record layer that is constructed for writing or reading with a predetermined light wavelength(s) and is absorptive to light of other wavelengths and a protective cover means that is selectively transparent to light of at least one of said predetermined wavelength(s). In one embodiment the disc unit is adapted for writing and reading with the same light wavelength and the cover means blocks other light wavelengths. In another embodiment the disc unit is adapted to reading with light of wavelength substantially different than the writing wavelength and the cover means selectively transmits the operative (write and read) wavelengths and selectively blocks a large proportion of other light wavelengths. In another embodiment the cover means is selectively transmissive to the reading wavelength and is displaceable to permit writing light onto the record layer.

2 Claims, 14 Drawing Figures

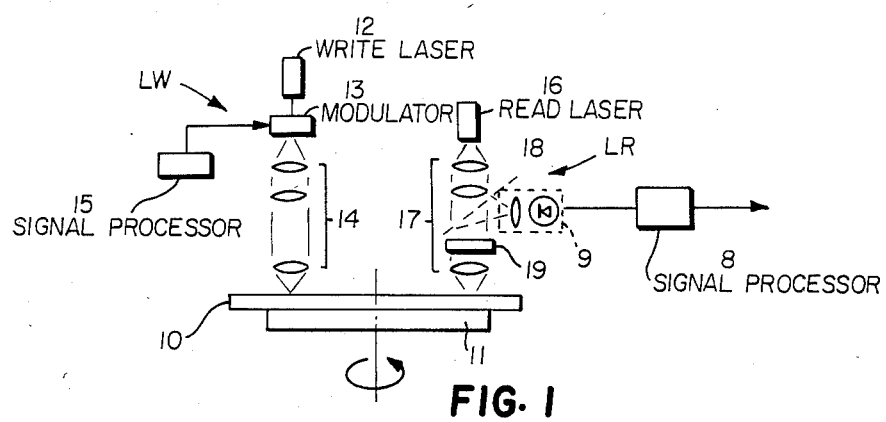
FIG. 1
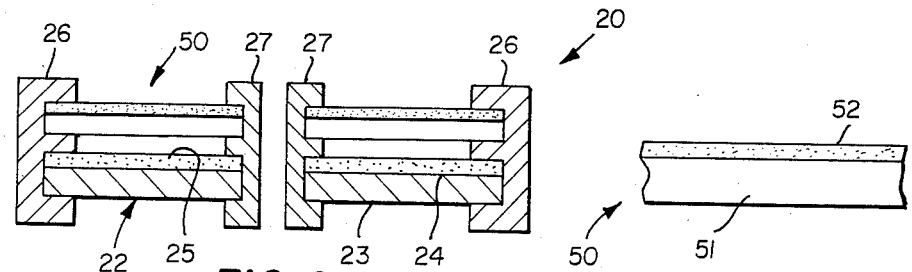 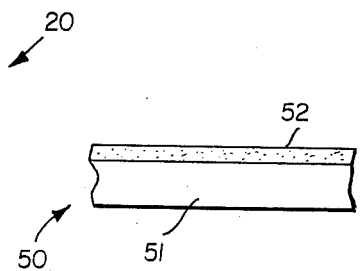
FIG. 2          FIG. 5
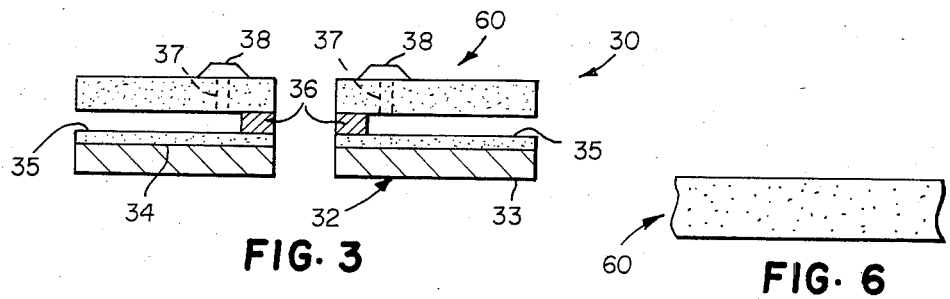 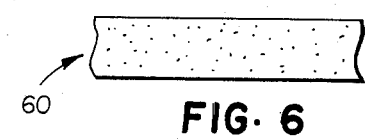
FIG. 3          FIG. 6
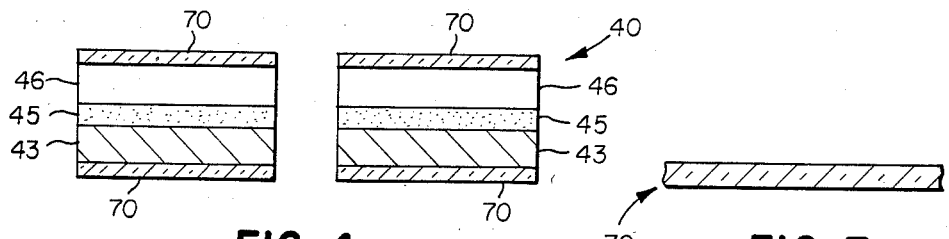 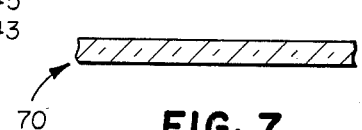
FIG. 4          FIG. 7

OPTICAL WRITE/READ UNIT WITH SELECTIVE-TRANSPARENCY COVER

BACKGROUND OF THE INVENTION

1. Field of the Invention

The present invention relates to high-density information storage units (e.g. optical disc units) of the type adapted for optical writing and/or reading (hereinafter write/read) with tightly focused, high intensity light beams, and more specifically to improved protective cover structure in such units.

Brief Description of Prior Art

Because of their great potential for high density information storage, there is active developmental interest in optical write/read system such as optical disc systems. Such systems typically form micron size information bits (e.g. light modulating marks) along recorded tracks on a surface of the disc. One common way to record (write) such marks is by scanning the optical disc with a tightly focused laser beam which is turned on and off according to an encoded signal that contains the information to be recorded. On playback (read), the tracks are illuminated by a tightly focused reading light beam and variations in the light passing from marked and unmarked track portions to a photodetector are sensed to reproduce the encoded signal. Although the disc configuration is currently the most popular format for use in such optical write/read systems, other formats are useful. This specification describes such optical storage media as optical discs with the understanding that there are other formats that will have equivalent utility in accord with the present invention. Also, the term "light", when used herein in its general sense, is intended to include electromagnetic radiation outside the visible spectrum, e.g. U.V. and infrared radiation.

One approach that is commonly used in recording information marks is for the optical disc to comprise a record layer (e.g. solvent coated, sputtered or vapor or vacuum deposited) which includes a material (e.g. a dye or pigment) that is absorptive to light of the writing wavelength. The high intensity writing light is absorbed by the record layer and forms marks, e.g., by a thermal deformation mechanism (such as ablation), by changing the light absorption characteristic of the record layer (such as dye bleaching) or by changing other light modulating properties (such as polarization characteristics).

Reading of the recorded marks can be with the same light wavelength or with a different light wavelength and can utilize intensity modulation of the read light beam (e.g. caused by absorption differences of marked and unmarked track portions), phase or diffraction modulation (e.g. caused by pit-like markings) or combinations of such light modulations or other modulations.

Due to the minute size of the recorded marks it is very important to protect the record surface of the optical discs from scratching and from dirt or dust particles. One general technique for accomplishing this is to provide a light transparent cover structure (e.g. an overcoat layer or a cover sheet) which has an exterior surface sufficiently spaced from the record surface so that scratches, dirt and dust thereon do not interfere with writing or reading of the underlying record surface. There are several known optical disc formats incorporating such covers.

It has been noted that with respect to certain record layer compositions that a decrease in writing (and sometimes reading) sensitivity occurs over time. Such decreases can have various causes, e.g., changes in the record layer composition or structure caused by temperature and humidity. However, it is believed that in some instances a contributing cause for such sensitivity loss is light-induced degradation in record layer absorption, e.g. bleaching or fading.

SUMMARY OF THE INVENTION

One important purpose of the present invention is to provide for optical write/read units, of the kind having protective covers, improved cover constructions that significantly reduce light induced degradation of the unit's write/read characteristics. Certain embodiments of the present invention attain advantage from write/read systems that use a beam(s) of a specific wavelength(s) or narrow wavelength range(s) and provide protective cover structure that is selectively light-transparent to the write and/or read light. As used herein in that context the term "selectively transparent" is intended to mean highly transmissive to the referred-to light wavelength and high non-transmissive to a significant proportion of other light.

Because the record layers often have absorption ranges which are broader than the cover sheet's selective-transparency range(s), the cover sheet in accord with the invention can reduce substantially the record layer degradation due to non-operative light (e.g. ambient light). For example, the intensity of ambient light in the particular operative write/read wavelength range(s) of the record layer is often considerably less than the cumulative intensity of all ambient light in the broader range(s) which could effect degradation of the record layer. Also, a record layer might be significantly degradable by high energy ultraviolet radiation but intended for writing or reading with other wavelengths. Thus, by providing a selectively transparent cover in accord with this invention, the keeping (or non-use) life of such optical write/read units can be increased without adversely affecting their operative characteristics (e.g. write/read sensitivity).

In one aspect, the present invention provides in an optical record unit of the type which is adapted for high density information storage and which comprises a support bearing a record layer that is constructed for writing and/or reading with a predetermined light wavelength(s), an improved protective cover means that is selectively transparent to said predetermined wavelength(s). In one preferred embodiment the record layer is adapted for writing and reading with a common wavelength and said cover means is constructed to transmit writing light within a predetermined, narrow wavelength range including such common wavelength and to block transmission of a large proportion of other light wavelengths.

In another preferred embodiment of the present invention, the record layer is adapted for writing and reading respectively with different predetermined light wavelengths and such cover means is constructed to transmit writing and reading light and to substantially block a large proportion of light other than the predetermined write and read wavelengths. In another preferred embodiment the cover means is selectively transparent to a predetermined light wavelength and displaceable to permit writing light onto the record layer.

BRIEF DESCRIPTION OF THE DRAWINGS

The subsequent description of preferred embodiments of the invention refers to the attached drawings wherein:

FIG. 1 is a schematic illustration of one optical disc write/read system with which the present invention is useful;

FIGS. 2-4 are cross-sectional views of exemplary optical disc units of different format respectively incorporating different embodiments of the present invention;

FIGS. 5-7 are respectively enlarged cross-sectional views of cover portions of the FIGS. 2-4 units;

DETAILED DESCRIPTION OF PREFERRED EMBODIMENTS

Figure 8:
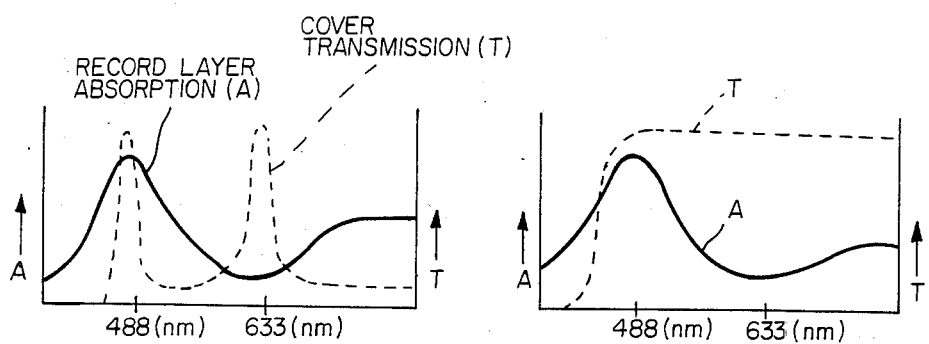
FIGS. 8-12 are curves illustrating the record layer absorption and cover transmission characteristics of several preferred disc unit embodiments of the present invention.

In the exemplary optical disc write/read system 1 shown in FIG. 1, an optical disc unit 10 is rotated on a turntable 11 in scanning relation to a laser writing assembly LW and a laser reading assembly LR. The laser writing and reading assemblies are shown diametrically opposite for ease of illustration; however it will usually be preferable to combine the assemblies, e.g. for common radial indexing to different track location on the disc unit. Also each of the assemblies can include tracking and focus servo controls (now shown but known in the art). Often the write/read assemblies share common optical components.

In general the writing assembly LW can include a writing laser 12, a light modulator 13 such as an acousto-optic cell, a series of light refractive elements 14 which provide a highly focused beam at the record layer of optical disc unit 10. A signal processor 15 addresses modulator 13 to turn the writing beam on and off in accord with the mark information to be recorded. Alternatively it is often preferred to use a laser (e.g. a diode laser) which is OFF-ON controlled directly by the information signal.

The reading assembly LR can include a reading laser 16 and optics 17 to focus light onto recorded tracks. Polarizing beamsplitter 18 and quarter wave plate 19 cooperate so that light reflected from tracks of the disc unit is directed (back through portions of optics 17) to a photoelectric detector 9 which provides output electrical signals to signal processor 8. In some embodiments the optical disc unit can be one which "flys" over a stationary reference surface. In some embodiments the disc can be of a transmission read-out kind and the detector portion of the read system is then below the disc unit. As will be described in more detail below, the write laser 12 and read laser 16 can be of the same wavelength or of different wavelengths.

FIG. 2 shows one illustrative optical disc unit 20 employing one embodiment of the present invention. The disc unit 20 comprises a flexible record disc 22, including a support 23 with an overlying reflective surface 24 and record layer 25, and a flexible disc cover 50. The flexible record disc and cover disc are symmetrically tensioned into a spaced condition by inner and outer annular retaining means 26, 27. A centering hub is provided in inner retaining mean 27 to cooperate with turntable 11. Further details of various optical disc units of this format are disclosed in U.S. Pat. No. 4,365,258. Exemplary preferred constructions for the record disc portion of such a unit are disclosed (for a dual wavelength write/read system) in U.S. Pat. No. 4,360,908 and (for a single wavelength write/read system) in U.S. Pat. No. 4,336,545.

Referring to FIG. 5, the disc cover portion 50 in accord with this embodiment of the present invention is shown in more detail. In the FIG. 5 embodiment, the selectively transparent disc cover comprises a flexible support 51 having a dye-binder layer 52, e.g. a dispersion of predetermined filter dye(s) in gelatin, formed (e.g. coated) thereon. Exemplary preferred materials for support 51 of this embodiment include acetate and polycarbonate, such materials being suitable for extruding or casting as a flexible member which has low birefringence. As described subsequently in more detail, the selection of a particular dye(s) and binder for layer 52 is based on the operative write/read wavelength(s) and the degradation characteristics of the optical disc record layer with which the cover 50 is to be used. In this regard technical publications such as "Kodak Filters For Scientific and Technical Uses" (Kodak Publication No. B-3) are useful in selection of filter coatings vis-a-vis particular recording layers. For example, for an infrared write/read record layer having a high absorption to an operative diode laser light wavelength (820-830 nm), a coating such as in Kodak Wratten filter No. 88A is useful (transmitting approximately 87% of the incident light of wavelength >800 nm and transmitting less than 2% of the incident light of wavelength <720 nm).

In one alternative preferred embodiment, the layer 52 can comprise a preselected dispersion of colliodal metal particles (e.g. Carey Lea Silver particles) in an appropriate photographic vehicle such as disclosed in *Research Disclosure*, Vol. 176, Item 17643, December 1978 (paragraph 9), published by Industrial Opportunities Ltd., United Kingdom. That is, it is known in the art that selective light transmission (or selective light absorption) can be attained by designing the particle size distribution and particle concentration of a dispersion of very small metal particles (e.g. 50Å–450Å) in a medium such as gelatin. These types of protective layers are particularly useful in preventing high energy shorter wavelengths (e.g. <500 mn) from degrading the recording layer while providing a pass-band for write/read light wavelengths above 500 nm.

Referring now to FIG. 3, there is shown another illustrative format of optical disc unit 30 employing another alternative preferred embodiment of the present invention. The format of disc unit 30 is the flying disc/flying cover sheet type which is described in more detail in U.S. Pat. No. 4,447,899. In general the unit 30 comprises a record disc 32, which includes a flexible support 33 having an overlying reflective layer 34 and record layer 35. A disc cover 60 is coupled to the record disc by a central spacer 36. Air inlet holes 37, covered by filter elements 38, allow air flow between the cover and record disc so that both "fly" with good stability when rotated by the method described in the Geyer and Howe application. Again, the write/read laser beams are directed through the cover sheet to the record layer of record disc 32. The record layer 35 can be, e.g., as described with respect to FIG. 2.

Referring to FIG. 6, the disc cover 60 portion of the FIG. 5 disc unit is shown in more detail. In the FIG. 6 embodiment of the present invention, the cover sheet 60 embodies a selective light transmission construction within the volume of the cover sheet, rather than as a layer upon a transparent substrate. Such constructions can employ filter dyes (e.g. of the kind described above) dissolved in the support material or they can employ small metal particles (of predetermined size distribution and concentration) dispersed in the support material.

Referring now to FIG. 4, there is shown another illustrative optical disc unit format that employs another embodiment of the present invention. The disc unit 40 is adapted for transmissive readout and comprises a transparent substrate 43 supporting a record layer 45 formed of an organic dyestuff which is thermally-responsive to form a clearly defined opening. Overlying the record layer 45 is a barrier layer 46 which is substantially transparent (see U.S. Pat. No. 4,340,959). In this embodiment the support 43 can be relatively rigid, for example glass. Protective cover means 70 are formed on both the lower and upper surfaces of the disc unit 40.

FIG. 7 shows the protective cover portions 70 in more detail. In this embodiment protective cover means 70 is an antireflection coating or dielectric stack of coatings have predetermined thicknesses and complex indices of refraction to control selective light transmission or selective light blocking by light interference effects. Examples of useful materials and coating techniques can be found in the arts of lens coatings (for blocking ultraviolet radiation), antiglare mirror coatings (for automobile mirrors) and in a wide variety of other technologies. (See for example "Antireflection Coatings Applied from Metal-Organic Derived Liquid Precursors"; Yoldas and O'Keeffe; *Applied Optics,* Vol. 18, No. 18, Sept. 15, 1979). Thin metal films such as described, for example, by Klein and Metz, *Photographic Science and Engineering* 5, 5 (1961); and by Salib and DePalma, *Photographic Science and Engineering,* 17, 165 (1963) also exhibit useful dichroic characteristics for cover means 70. Also, one skilled in the art can refer to Kodak Publication No. B-3 mentioned above for its description of the characteristic of available dichroic filters.

In general, the different kinds of selective transparency cover means described above (and other equivalent kinds) will be useful fairly interchangeably with the different format disc units described above as well as with other disc unit formats (see e.g. U.S. Pat. No. 4,038,663 and U.S. Pat. No. 4,074,282). Of course, the format and mode of use of some disc formats may well render one selective-transparency cover means approach preferable to another from a fabrication or performance viewpoint. For example a flying cover sheet might suffer in performance from a dielectric stack approach. The important aspect, from the viewpoint of the present invention, is to employ a selective-transparency cover means which is tailored with respect to the record element so as to transmit sufficient radiation of the operative wavelength(s) and to significantly block a significant portion of non-operative radiation so as to prevent or reduce undesired degradation of the recording layer. This concept is further illustrated in FIGS. 8–11.

In FIG. 8 solid-line curve A illustrates schematically an exemplary light absorption versus light wavelength characteristic for a dual wavelength write/read record element of the kinds described in U.S. Pat. No. 4,360,908 (write~488 nm; read~633 nm). The dotted line curve T illustrates an optimized, and thus highly preferred, light transmittance versus light wavelength characteristic for the cover means of such a disc unit. Such an optimized characteristic is sometimes difficult to attain precisely but can be closely approached or approximated in varing useful degrees. For example Filter No. 32 on page 66 of Kodak Publication B-3 can be useful in such a combination with a "hot mirror" filter to closely approximate such a transmission characteristic. Also, write/read characteristics of the record element can be designed to match the transmittance characteristics of available filter materials such as in Kodak Publication B-3. Further dichroic interference-type hot mirror structures can be combined with gelatin filters having appropriate pass-bands to approximate desired characteristics such as the optimized one shown in FIG. 8.

Figure 9:
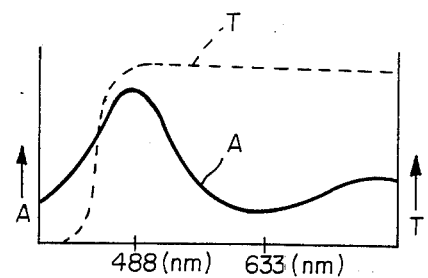

FIG. 9 illustrates another less optimized, but highly useful, approach for providing selective-transparency cover means for record elements of the kind disclosed in U.S. Pat. No. 4,390,908. In this embodiment the cover means is designed to highly transmit light of wavelength above 470(nm) and to significantly block damaging high energy light (including U.V. radiation) below that wavelength. Such cover means can be readily designed by the various techniques described above.

Figure 10:
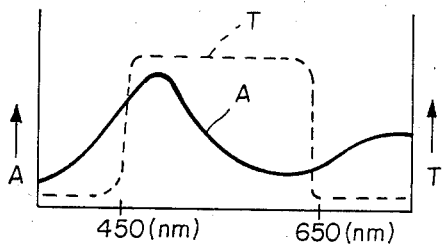
Figure 11:
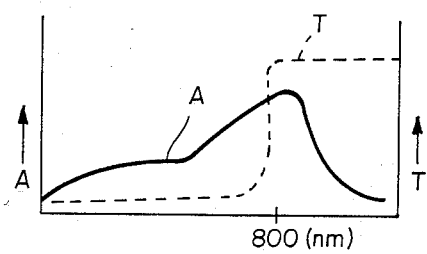
Figure 12:
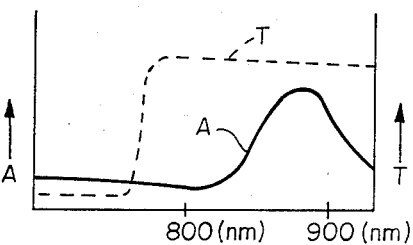

FIGS. 10–12 disclose other exemplary preferred transmittance characteristics for protective cover means in accord with the present invention. In FIG. 10 the cover means provides a light pass-band from about 450 to about 650 nanometers which is highly useful for record elements of the type described above (write 488, read 633). FIG. 11 discloses a cover characteristic which is highly useful with a laser diode (e.g. 820–830 nm emission), write/read apparatus of the kind where writing and reading is effected the same light wavelength. U.S. Pat. No. 4,320,489 discloses record elements useful with such diode laser, single wavelength systems. FIG. 12 discloses cover means having selective light transmission characteristics which are quite useful with an Olympus two axis optical head system (TAOHS) lens assembly (write 870 nm and read 780 nm). Such cover means can be fabricated, e.g., using Filter No. 89B at page 33 of Kodak Publication B-3.

Figure 13:
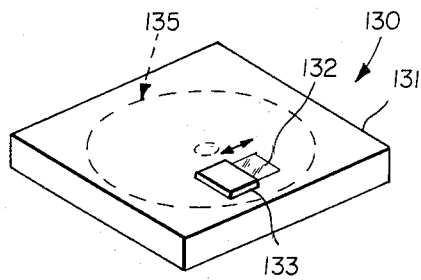
FIG. 13 is a perspective view of another disc unit format incorporating another embodiment of the present invention.

FIG. 13 shows another exemplary disc unit format employing another preferred embodiment of the present invention. Thus, disc unit 130 comprises an opaque cartridge housing 131 which has a selectively transparent window portion 132. A selectively transparent cover portion 133 is mounted in the cartridge for movement to positions aligned with and retracted from the window portion. Mounted for rotation within the cartridge is an optical disc 135. In accord with the present invention, the record layer of disc 135 is adapted for writing with a first light wavelength and reading with a different second light wavelength. The window 132 extends above a radial sector and is selectively transparent to the disc's writing and reading wavelengths and substantially non-transmissive to other wavelengths. The cover portion 133 is selectively transparent to the disc's read wavelength and substantially non-transmissive to other light wavelengths, including the disc's writing wavelength. For recording the cover portion 133 is in a retracted position so that the writing light wavelength can pass window 132. After recording the cover portion 133 is moved below window 132 so that only read light wavelengths are transmitted to the disc 135.

Figure 14:
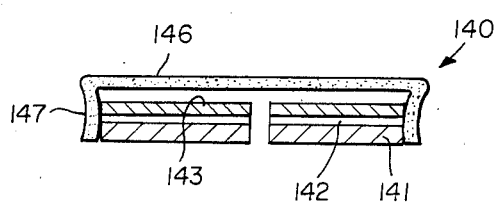
FIG. 14 is a cross-sectional view of another disc unit format incorporating another embodiment of the present invention.

FIG. 14 shows another disc unit format employing another embodiment of the present invention. The disc unit 140 comprises a rigid disc substrate 141 having a recording layer 142 which is adapted for writing with one light wavelength and reading with a different light wavelength. A protective cover layer 143 that is selectively transparent to the writing and reading light wavelengths overlies the recording layer. A protective cover drum 146 has a flange 147 which is adapted to snap fit onto the edges of the disc substrate 141 and is selectively transparent to the read (but not the write) light wavelength. The cover drum 146 is removed during writing and replaced thereafter so that information is not accidentally erased (re-recorded upon) during reading.

The invention has been described in detail with particular reference to preferred embodiments thereof, but it will be understood that variations and modifications can be effected within the spirit and scope of the invention.

What is claimed is:

1. In an optical write/read unit of the type adapted for use with writing and reading light beams of first and second different wavelengths, respectively, said unit comprising (i) a support, (ii) a record layer overlying said support, said record layer being responsive to light of said first wavelength to produce marks thereon, said marks being detectable when said layer is scan illuminated with light of said second wavelength, and (iii) protective cover means overlying said record layer, the improvement wherein said cover means is highly transmissive to light of said first and second wavelengths and highly non-transmissive to a large proportion of light at wavelengths longer than the longer of said first and second wavelengths, and at wavelengths shorter than the shorter of said first and second wavelengths.

2. In an optical write/read unit of the type adapted for use with writing and reading light beams of a predetermined wavelength, said unit comprising (i) a support, (ii) a record layer overlying said support, said record layer being responsive to said writing light beam to produce marks thereon, said marks being detectable when said layer is scan illuminated by said reading light beam, and (iii) protective cover means overlying said record layer, the improvement wherein said cover means is highly transmissive to light of said predetermined wavelength and highly non-transmissive to a large proportion of light at wavelengths above and below said predetermined wavelength.

* * * * *